(12) United States Patent
Yoshikawa et al.

(10) Patent No.: US 10,061,484 B2
(45) Date of Patent: Aug. 28, 2018

(54) TERMINAL APPARATUS, FAULT REPORT SYSTEM, AND NON-TRANSITORY COMPUTER READABLE MEDIUM

(71) Applicant: FUJI XEROX CO., LTD., Tokyo (JP)

(72) Inventors: Hayato Yoshikawa, Kanagawa (JP); Atsushi Kitagawara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 369 days.

(21) Appl. No.: 14/716,309

(22) Filed: May 19, 2015

(65) Prior Publication Data

US 2016/0140097 A1   May 19, 2016

(30) Foreign Application Priority Data

Nov. 17, 2014   (JP) ................. 2014-233073

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 3/0488* (2013.01); *G06F 3/04845* (2013.01); *G06F 11/32* (2013.01); *G06F 11/321* (2013.01); *H04N 1/00307* (2013.01); *H04N 1/32128* (2013.01); *G06F 3/121* (2013.01); *G06F 3/1234* (2013.01); *G06F 3/1289* (2013.01);
(Continued)

(58) Field of Classification Search
CPC .. G06F 3/0484; G06F 3/04845; G06F 3/0488; G06F 11/32; G06F 11/321; G06T 11/60; G06T 2219/004; A61B 6/468; A61B 2560/0295
See application file for complete search history.

(56) References Cited

U.S. PATENT DOCUMENTS 5,526,478 A  *  6/1996  Russell, Jr.  .........  G06F 3/04812
715/202
6,133,925 A  *  10/2000  Jaremko  ...............  G06F 17/241
345/441

(Continued)

FOREIGN PATENT DOCUMENTS

CN      101901109 A      12/2010
CN      103064581 A       4/2013
(Continued)

OTHER PUBLICATIONS

Nov. 17, 2017 Office Action issued in Chinese Patent Application No. 201510378441.X.

*Primary Examiner* — Dino Kujundzic
(74) *Attorney, Agent, or Firm* — Oliff PLC

(57) ABSTRACT

A terminal apparatus includes an input unit, and a browsing unit. The input unit inputs a fault which has occurred in a target electronic apparatus. The browsing unit allows browsing of the fault input by the input unit. The input unit includes an adding unit that adds, to an image concerning the fault, commentary information which includes location information indicating a part within the image and explanatory information regarding the part within the image indicated by the location information. The browsing unit is configured such that a display location of the location information, out of the commentary information, is unchangeable.

8 Claims, 15 Drawing Sheets

(51) Int. Cl.
*G06F 11/32* (2006.01)
*G06F 3/0488* (2013.01)
*H04N 1/00* (2006.01)
*H04N 1/32* (2006.01)
*G06T 11/60* (2006.01)
*G06F 3/12* (2006.01)

(52) U.S. Cl.
CPC ............ *G06F 3/1292* (2013.01); *G06T 11/60* (2013.01); *H04N 2201/0094* (2013.01); *H04N 2201/0098* (2013.01); *H04N 2201/3266* (2013.01); *H04N 2201/3273* (2013.01)

(56) References Cited

U.S. PATENT DOCUMENTS

| | | | | |
|---|---|---|---|---|
| 6,230,170 B1* | 5/2001 | Zellweger | ............ | G06F 17/211 345/467 |
| 6,383,135 B1* | 5/2002 | Chikovani | ............ | G06F 19/325 128/904 |
| 7,010,751 B2* | 3/2006 | Shneiderman | ........ | G06F 17/241 707/999.004 |
| 8,908,943 B2* | 12/2014 | Berry | ...................... | G06T 19/00 382/128 |
| 2005/0104896 A1* | 5/2005 | Kerr | ...................... | G06F 19/321 345/619 |
| 2008/0229186 A1* | 9/2008 | Gear | ...................... | G06T 19/00 715/233 |
| 2009/0229819 A1* | 9/2009 | Repin | ..................... | E21B 47/00 166/250.01 |
| 2010/0171682 A1* | 7/2010 | Chen | ...................... | G06F 19/321 345/55 |
| 2010/0271391 A1* | 10/2010 | Repin | ..................... | G06T 19/00 345/619 |
| 2012/0159391 A1* | 6/2012 | Berry | .................. | A61B 5/4824 715/823 |
| 2015/0067469 A1* | 3/2015 | Shuto | .................... | G06F 17/241 715/232 |

FOREIGN PATENT DOCUMENTS

| JP | 2001-203831 A | 7/2001 |
|---|---|---|
| JP | 2013-026778 A | 2/2013 |
| JP | 2014-175689 A | 9/2014 |

\* cited by examiner

TERMINAL APPARATUS, FAULT REPORT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-233073 filed Nov. 17, 2014.

BACKGROUND (i) Technical Field

The present invention relates to a terminal apparatus, a fault report system, and a non-transitory computer readable medium.

(ii) Related Art

There is a case where an explanation is provided for a location specified in an image to be included in transmission information by adding commentary information, such as annotation information, within the image.

In such a case, a method for editing the image and directly adding an image, such as an arrow, for specifying the location may be used. However, if the image is directly edited as described above, part of the original image information may be lost, and the annotation information may make it difficult to see the image content.

Therefore, a method is also available in which annotation information is held separately from image data and the annotation information is added to the image data when the image is browsed. In such a method, if the annotation information is in the way when browsing the image, it is possible to edit the annotation information.

However, if the annotation information is edited when the image is browsed, the location indicated by the original annotation information may be lost.

SUMMARY

According to an aspect of the invention, there is provided a terminal apparatus including an input unit, and a browsing unit. The input unit inputs a fault which has occurred in a target electronic apparatus. The browsing unit allows browsing of the fault input by the input unit. The input unit includes an adding unit that adds, to an image concerning the fault, commentary information which includes location information indicating a part within the image and explanatory information regarding the part within the image indicated by the location information. The browsing unit is configured such that a display location of the location information, out of the commentary information, is unchangeable.

BRIEF DESCRIPTION OF THE DRAWINGS

Exemplary embodiments of the present invention will be described in detail based on the following figures, wherein.

DETAILED DESCRIPTION

Next, exemplary embodiments of the present invention will be described in detail with reference to figures.

Figure 1:
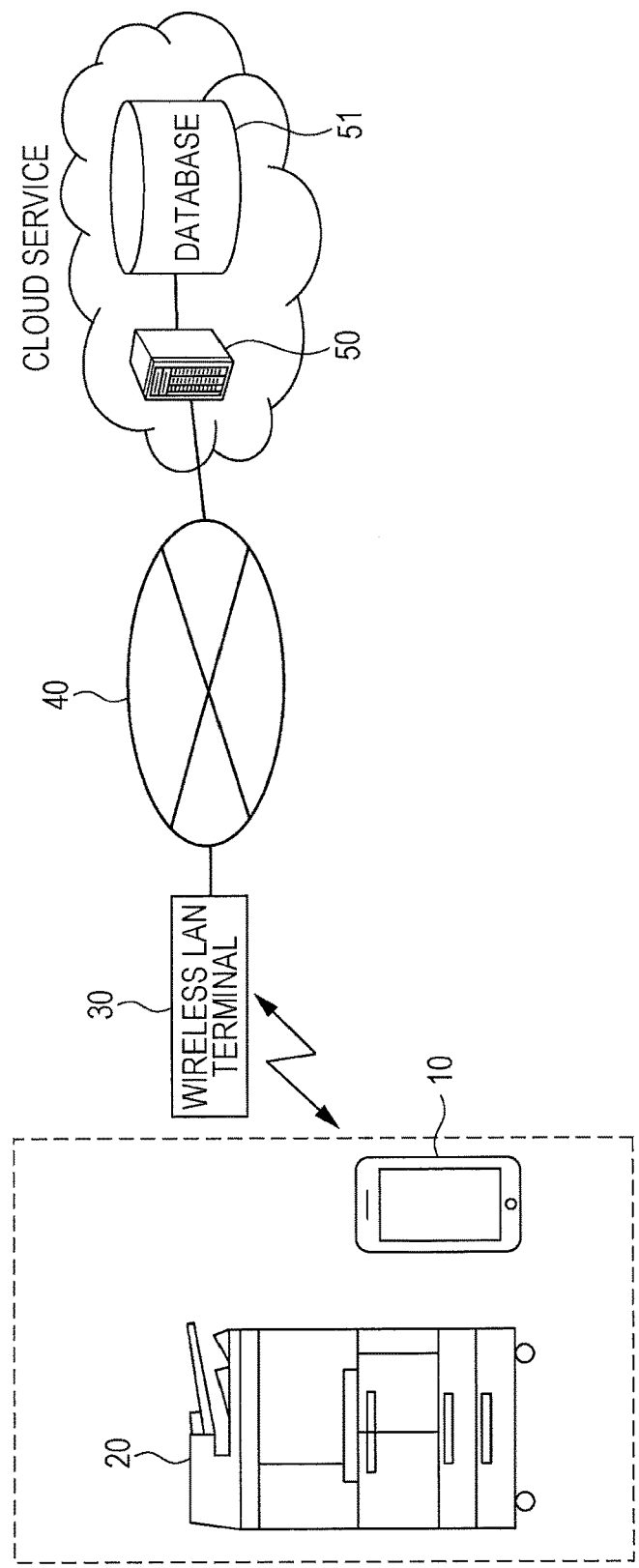
FIG. 1 is a diagram illustrating a system configuration of a fault report system according to an exemplary embodiment of the present invention.

FIG. 1 is a system diagram illustrating a configuration of a fault report system according to an exemplary embodiment of the present invention.

A fault report system according to an exemplary embodiment of the present invention includes, as illustrated in FIG. 1, a terminal apparatus 10 such as a personal computer, a smartphone, or a tablet terminal apparatus, a server apparatus 50, and a database (fault information storage apparatus) 51. The server apparatus 50 and the database 51 form a parent apparatus which performs communication with the terminal apparatus 10 to receive fault information from the terminal apparatus 10 and store the received fault information.

In the present invention, the terminal apparatus 10 may be of any type as long as it is capable of reporting fault information to the server apparatus 50 through a communication network. However, in this exemplary embodiment, a case will be described where the terminal apparatus 10 is a smartphone which includes a camera capable of imaging a fault occurrence location and a touch panel capable of touch input.

The terminal apparatus 10 is carried by a serviceman (maintenance worker) who performs maintenance management, repair, and the like of an image forming apparatus 20, such as a printer, used by an end user. The terminal apparatus 10 is used to input and transmit fault information to the server apparatus 50 and to browse through the server apparatus 50 fault information stored in the database 51.

The terminal apparatus 10 and the server apparatus 50 are connected through a wireless LAN terminal 30 such as a Wi-Fi router and an Internet communication network 40, and perform transmission and reception of fault information and the like.

In the case where the terminal apparatus 10 is a cellular phone apparatus, a smartphone, or the like, the terminal apparatus 10 and the server apparatus 50 may be connected through a cellular phone line network to enable transmission and reception of fault information.

In the fault report system according to this exemplary embodiment, when a fault such as a breakdown or abnormal behavior has occurred in the image forming apparatus 20, which is a target electronic apparatus installed in the place of an end user, a serviceman who is carrying the terminal apparatus 10 comes to the place of the image forming apparatus 20. Then, the serviceman inputs fault information including a model name of the product, a serial number, fault content, an image of the fault occurrence location, and the like to the terminal apparatus 10, and transmits the fault information to the server apparatus 50 through the wireless LAN terminal 30 and the Internet communication network 40.

The server apparatus 50 stores and saves the received fault information in the database 51. In response to a browsing request from the terminal apparatus 10, the server apparatus 50 searches the database 51 and forwards corresponding fault information to the terminal apparatus 10.

Figure 2:
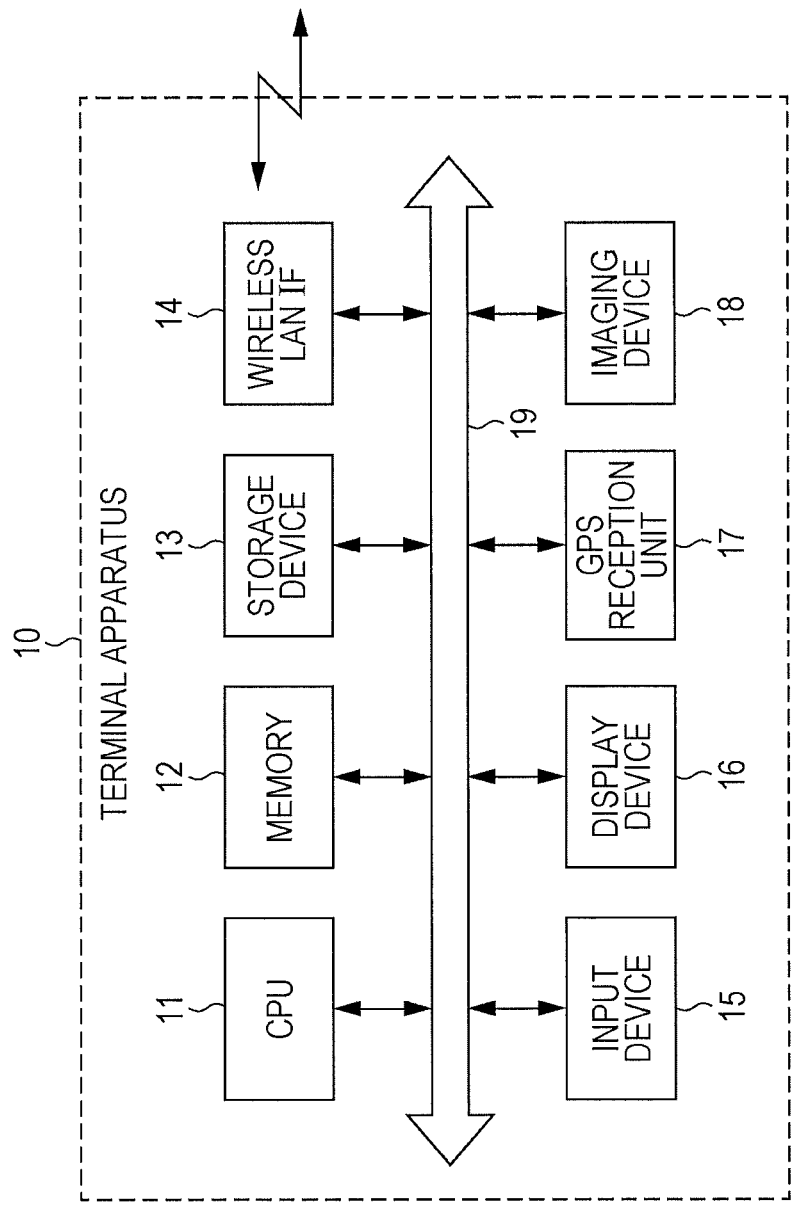
FIG. 2 is a block diagram illustrating a hardware configuration of a terminal apparatus in the fault report system according to the exemplary embodiment of the present invention.

Next, a hardware configuration of the terminal apparatus 10 in the fault report system according to this exemplary embodiment is illustrated in FIG. 2.

The terminal apparatus 10 includes, as illustrated in FIG. 2, a central processing unit (CPU) 11, a memory 12 which is capable of temporarily storing data, a storage device 13 such as a flash memory, a wireless LAN interface (IF) 14 which performs transmission and reception of data through wireless communication with the wireless LAN terminal 30, an input device 15 such as a touch sensor, a display device 16, a global positioning system (GPS) reception unit 17, and an imaging device 18 such as a camera. These components are mutually connected through a control bus 19.

In the terminal apparatus 10 according to this exemplary embodiment, a touch panel, which includes a touch sensor as the input device 15 for detecting a touch location, is provided on the display device 16. By using the touch panel, displaying and user inputting are performed.

The GPS reception unit 17 detects the current location of the terminal apparatus 10. The GPS reception unit 17 receives and processes, for example, radio waves from three or more GPS satellites orbiting above the earth, and thus detects the current location of the terminal apparatus 10, for example, as location information including latitude and longitude information.

The CPU 11 executes predetermined processing based on a control program stored in the memory 12 or the storage device 13 and controls operations of the terminal apparatus 10. The control program may be acquired by downloading through the Internet communication network 40 or a cellular phone line network and provided to the CPU 11.

With execution of the aforementioned control program, the terminal apparatus 10 according to this exemplary embodiment performs operations of inputting and browsing of fault information, as described below.

The terminal apparatus 10 has a function (input unit) for inputting a fault which has occurred at the image forming apparatus 20, which is a target electronic apparatus, and a function (browsing unit) for allowing browsing of the input fault.

Then, in an input mode for inputting the content of fault information to report the fault content of the image forming apparatus 20, the terminal apparatus 10 adds (adding unit), to image data to be included in the fault information, annotation information (commentary information) which includes location information indicating a location where an explanation is provided within the image and explanatory information regarding the location. That is, the terminal apparatus 10 adds, to the image concerning the fault, annotation information (commentary information) which includes the location information indicating a part within the image and the explanatory information concerning the part within the image indicated by the location information.

Then, in a browsing mode for browsing the fault information, the terminal apparatus 10 controls, based on a touch operation on the touch panel, the annotation information to be added to the image data and displayed on the touch panel, by changing the display location of the explanatory information, without changing the display location of the location information. That is, the terminal apparatus 10 performs browsing of the fault in a state in which the display location of the location information, out of the commentary information, is not changeable.

Furthermore, in the browsing mode, the terminal apparatus 10 has a function for inputting a selection as to whether or not annotation information is to be added to image data and displayed.

Then, upon the display control of the touch panel, the terminal apparatus 10 performs, based on the selection that has been input, control of switching between displaying on the touch panel image data with annotation information added thereto and displaying on the touch panel only image data without the annotation information being added thereto.

Specifically, when an option of displaying image data with annotation information added thereto is input, the terminal apparatus 10 displays on the touch panel the image data with the annotation information added thereto. On the other hand, when an option of displaying image data without annotation information being added thereto is input, the terminal apparatus 10 collectively deletes annotation information and displays on the touch panel the image data without the annotation information being added thereto.

That is, even in the case where plural pieces of annotation information are added to image data, a user is able to, when browsing fault information, collectively switch between whether or not to add the annotation information to the image data.

In the description of this exemplary embodiment provided below, a case will be described where the location information is displayed in a circular shape and the explanatory information is a text field (comment field) which is provided on the circumference of the circular-shape display. However, the location information and the explanatory information are not limited to the above case.

The circular-shape display is information for indicating the position of a fault occurrence location of the image forming apparatus 20 as a target electronic apparatus, and the text field is information for explaining the content of the fault.

In the browsing mode, the terminal apparatus 10 displays the text field on the touch panel by rotating the text field around the circular-shape display, based on a touch operation on the touch panel, without changing the display location of the circular-shape display.

In the browsing mode, the terminal apparatus 10 may perform control such that, based on a drag operation on the circular-shape display on the touch panel, the display location of the circular-shape display is changed, and in accordance with the completion of the drag operation on the circular-shape display, the circular-shape display is returned to the original display location and displayed.

Furthermore, the terminal apparatus 10 may change either the shape, size, or color of the circular-shape display, in accordance with the content of the fault to report. For example, when the fault content is a paper jam, the circular-shape display may be red, and when the fault content is generation of an abnormal noise, the circular-shape display may be blue.

Next, a specific operation example for the case where the terminal apparatus 10 is used in the fault report system according to this exemplary embodiment will be described with reference to figures.

Figure 3:
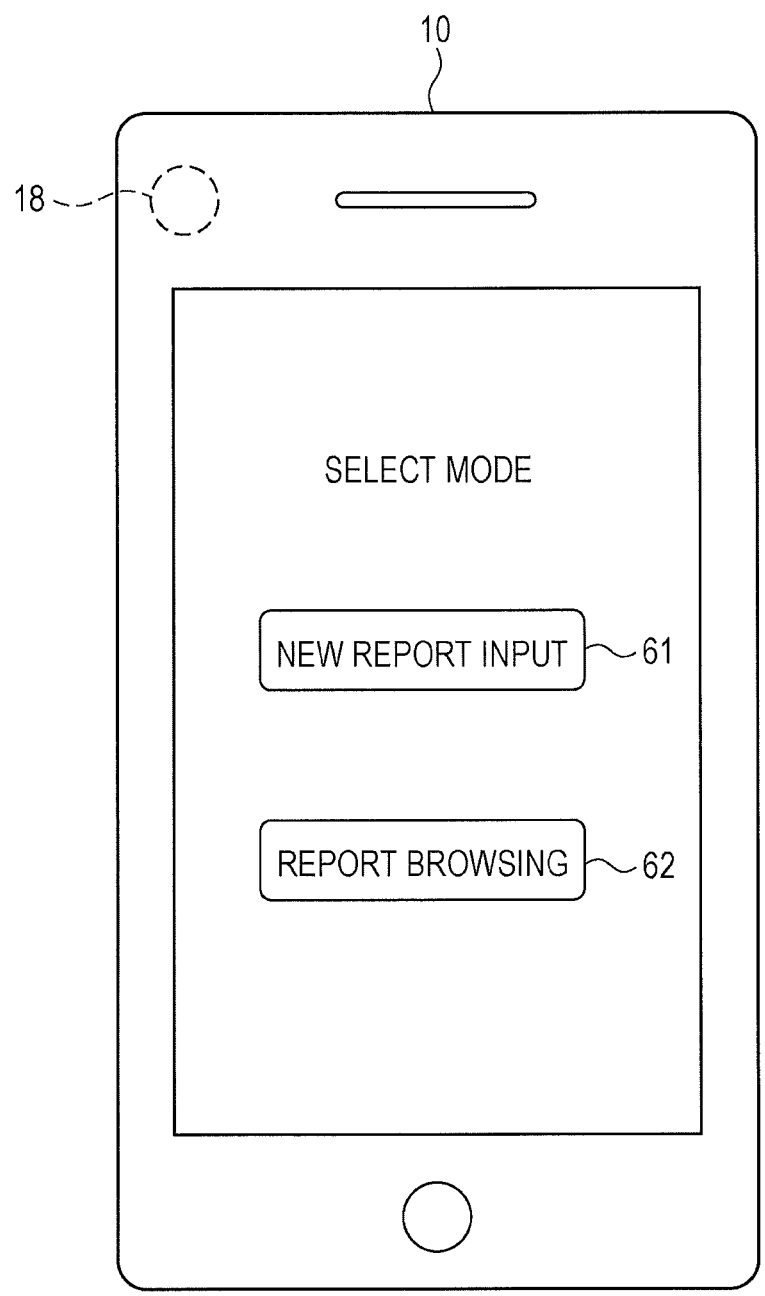
FIG. 3 is a diagram illustrating a display screen example of a mode selection screen displayed on the terminal apparatus.

First, a display screen example of the terminal apparatus 10 for a case where a control program for performing fault report is activated is illustrated in FIG. 3. FIG. 3 illustrates a display screen example of the terminal apparatus 10 which includes a touch panel that functions as the display device 16 and the input device 15. Furthermore, on the side opposite the touch panel of the terminal apparatus 10, the imaging device 18 for capturing an image is provided.

The display screen example illustrated in FIG. 3 is a mode selection display screen on which a new report input button 61 and a report browsing button 62 are displayed.

The new report input button 61 is a button for allowing shift to a new report input mode for transmitting new fault information to the server apparatus 50. The report browsing button 62 is a button for allowing shift to a report browsing mode for browsing fault information stored in advance in the database 51.

Figure 4:
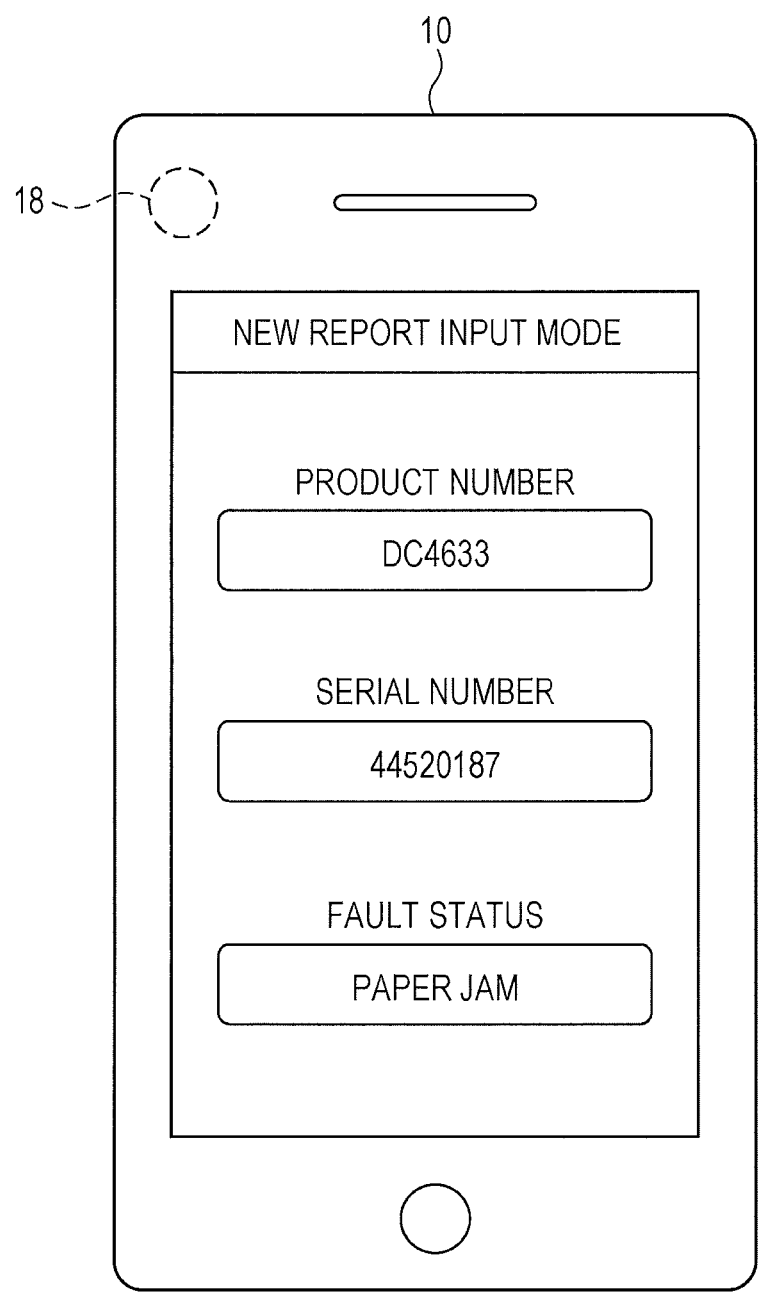
FIG. 4 is a diagram illustrating a display screen example of a new report input mode displayed on the terminal apparatus.

On the display screen illustrated in FIG. 3, when the new report input button 61 is pressed down, the terminal apparatus 10 shifts to the new report input mode, and a screen is displayed as illustrated in FIG. 4.

In the display screen example illustrated in FIG. 4, a screen for inputting the product number, the serial number, and fault information of a target electronic apparatus for which fault report is performed, is displayed.

Figure 5:
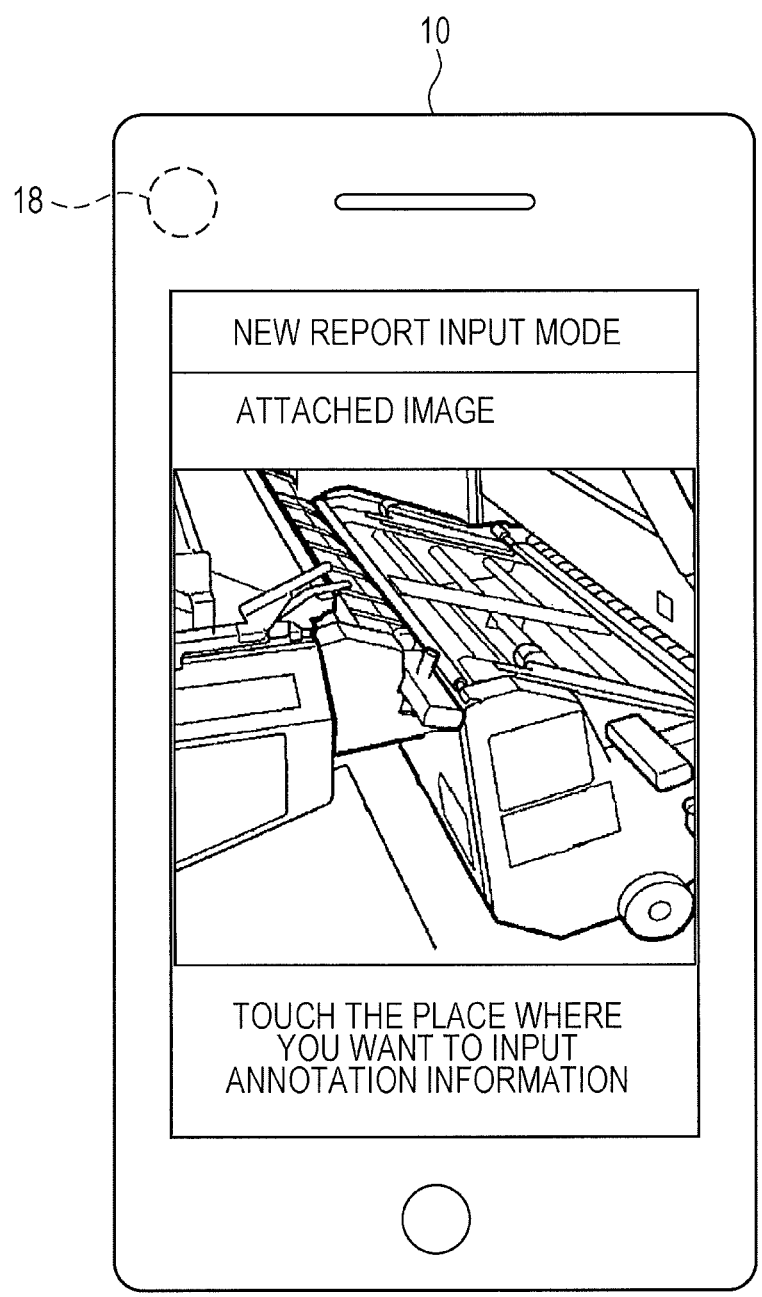
FIG. 5 is a diagram illustrating a display screen example for a case where an image captured by an imaging device is attached to fault information.

Next, FIG. 5 illustrates a display screen example for a case where the display screen illustrated in FIG. 4 is scrolled by dragging a finger upwards or downwards on the screen to attach an image captured by the imaging device 18 to fault report. In this exemplary embodiment, it is possible to add annotation information (commentary information) within an image when attaching the image to the fault information. An operation method for adding the annotation information will be described later.

Figure 6:
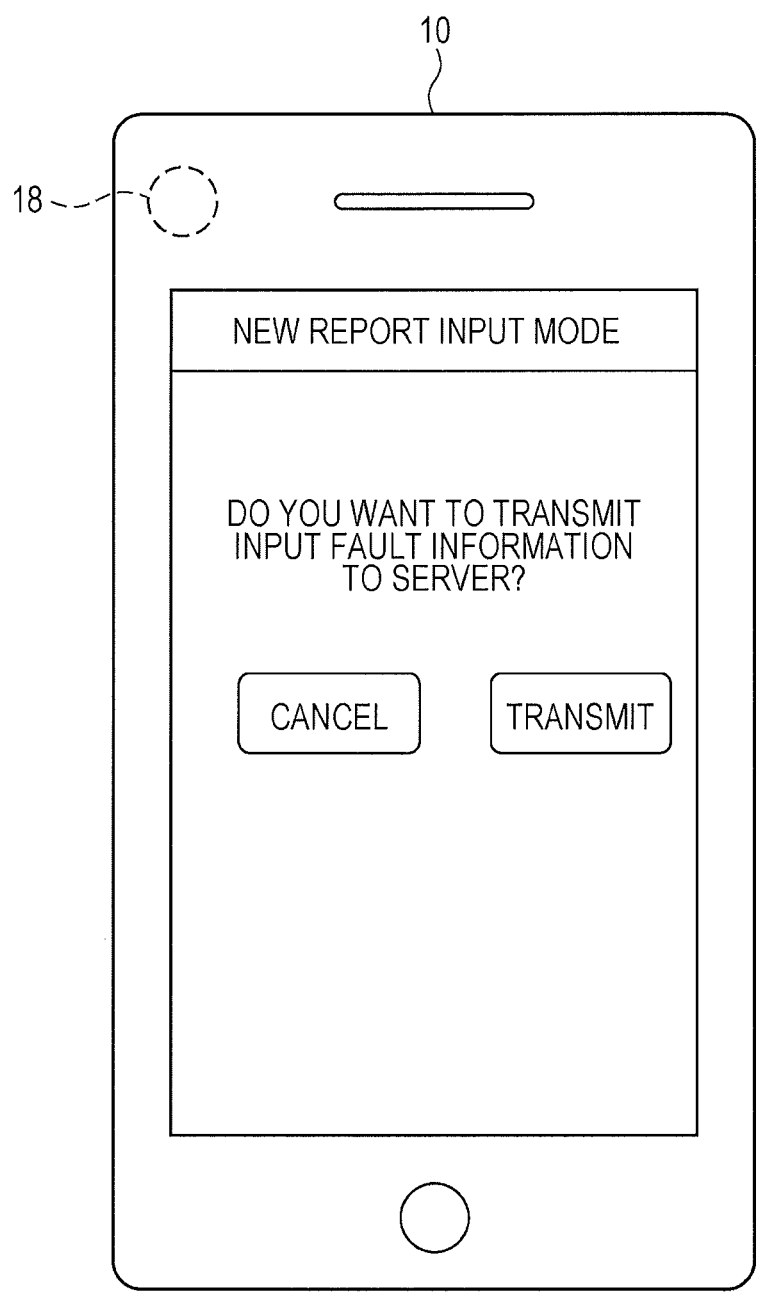
FIG. 6 is a diagram illustrating a display screen example of the terminal apparatus for a case where the transmission propriety of fault information is input.

When input of a required entry for the fault report is finished and the screen is further scrolled, a screen is displayed as illustrated in FIG. 6. When the user presses down a transmit button, the input fault information is transmitted to the server apparatus 50 through the wireless LAN terminal 30 and the Internet communication network 40.

In FIG. 5, a message "Touch the place where you want to input annotation information" is displayed on the touch display prompting input of the annotation information.

Figure 7:
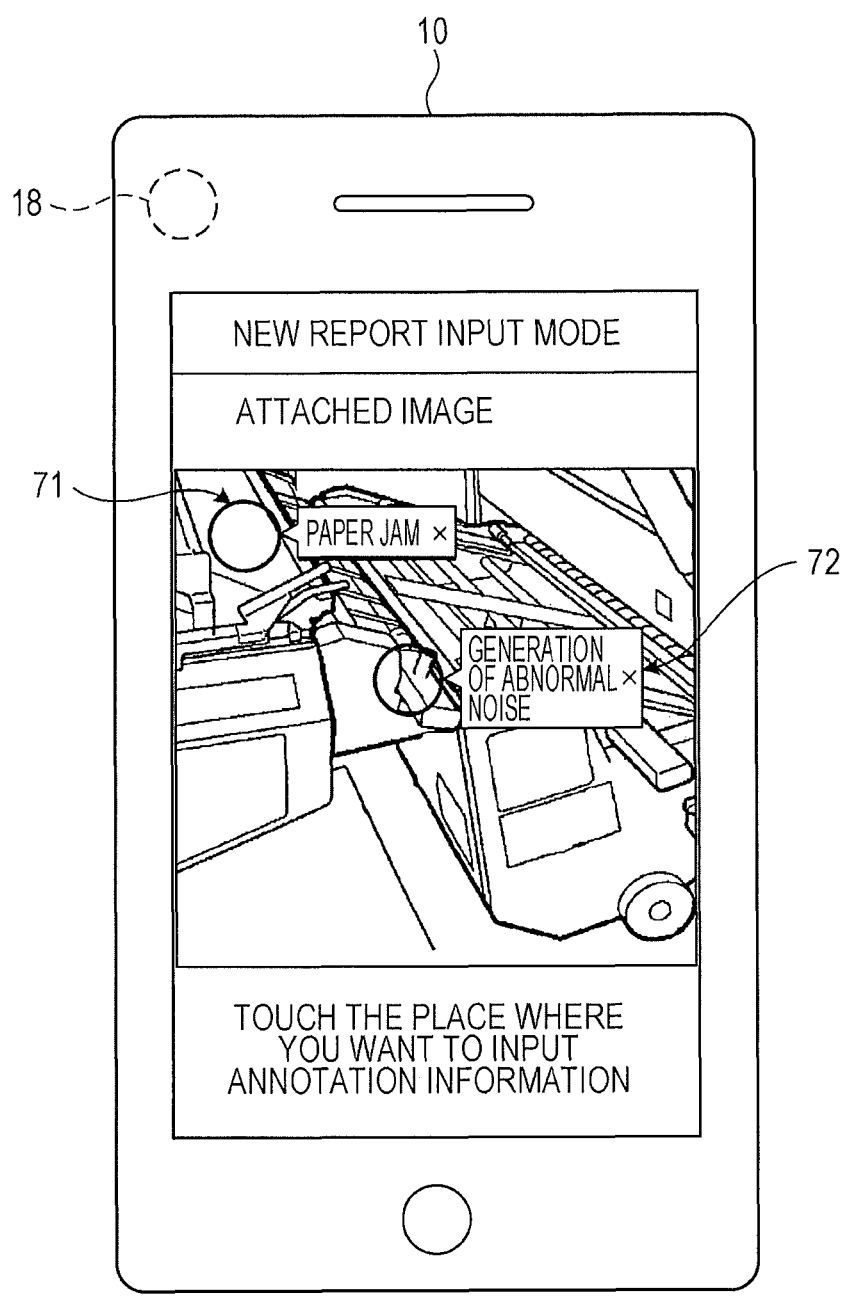
FIG. 7 is a diagram illustrating a screen obtained when a user touches an image displayed on a touch panel to add annotation information to the image.

FIG. 7 illustrates a screen obtained when the user touches the image displayed on the touch panel to add annotation information 71 an 72 in the state illustrated in FIG. 5.

In FIG. 7, the annotation information 71 indicates the location where a "paper jam" has occurred, and the annotation information 72 indicates the location where an "abnormal noise" has been generated.

Figure 8:
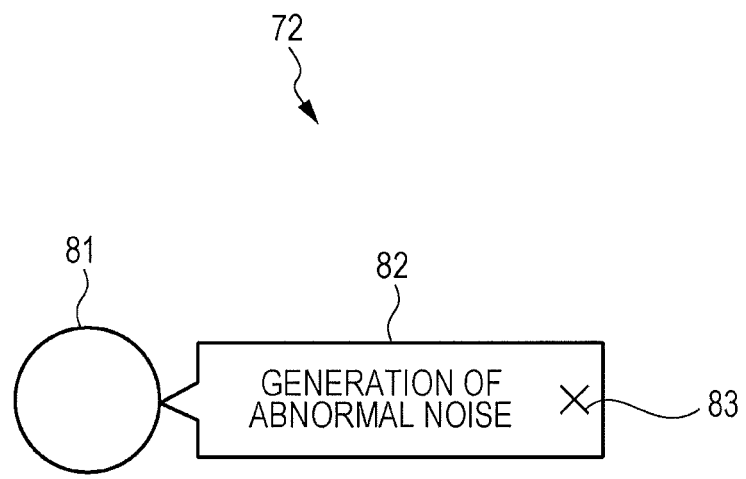
FIG. 8 is a diagram for explaining a configuration of the annotation information illustrated in FIG. 7.

Next, a configuration of the annotation information 72 illustrated in FIG. 7 will be described with reference to FIG. 8. The annotation information 72 includes, as illustrated in FIG. 8, location information 81 and explanatory information 82.

The location information 81 is displayed in a circular shape for indicating the location where a fault has occurred, and the explanatory information 82 is a comment field for explaining the content of the fault. The explanatory information 82 is displayed in proximity to the circumference of the circular location information 81.

At an edge of the comment field of the explanatory information 82, a symbol 83 is provided for deleting the annotation information 72. When the user touches (taps) the symbol 83 on the touch panel, the entire annotation information 72 is deleted.

Furthermore, by touching (tapping) the location information 81 and the explanatory information 82, the location information 81 and the explanatory information 82 become selected information. When the user slides their finger in a state in which the location information 81 and the explanatory information 82 are touched (tapped), display locations of the location information 81 and the explanatory information 82 are changed in accordance with the sliding action.

When the user desires to add new annotation information within an image, the user may provide an explanation by touching any location within the image on the touch panel, so that the new annotation information is added. When the user touches a text field, a keyboard display emerges to allow the user to input text of the content of the explanation.

Figure 9:
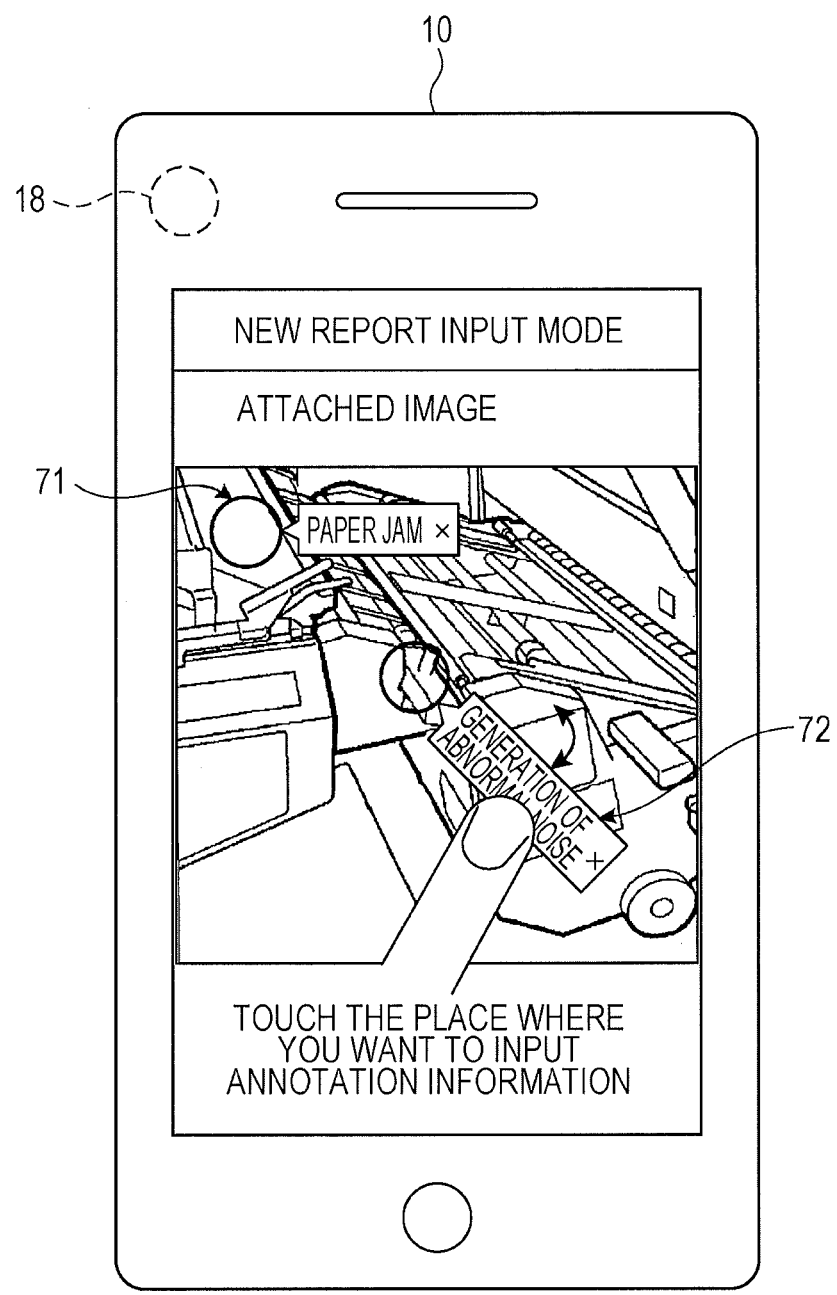
FIG. 9 illustrates a display screen example for a case where a user drags and moves explanatory information on an image illustrated in FIG. 8.

In the initial state, as illustrated in FIG. 8, the explanatory information 82 is provided on the right side of the location information 81. In the new report input mode, as illustrated in FIG. 9, the user may drag and move the explanatory information 82. When the explanatory information 82 is input after being moved, the explanatory information 82 is displayed at the moved location when the image is browsed.

Next, an operation example for a case where the fault information input as described above is browsed with the terminal apparatus 10 will be described with reference to figures.

To browse fault information stored in the database 31 with the terminal apparatus 10, the report browsing button 62 is selected in the mode selection screen illustrated in FIG. 3, and the terminal apparatus 10 thus enters the report browsing mode.

Figure 10:
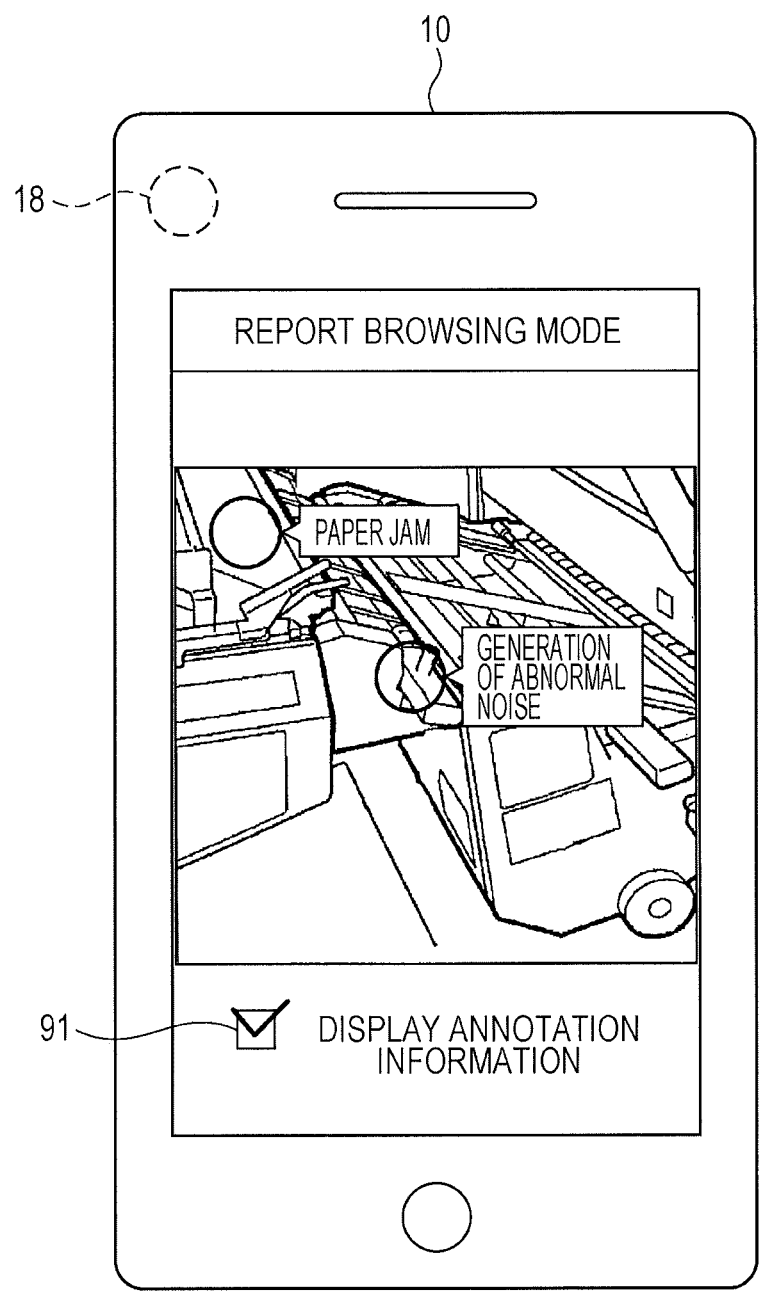
FIG. 10 illustrates a display screen example displayed on the terminal apparatus when fault information is selected and browsed in a report browsing mode.

Then, in the report browsing mode, when fault information to be confirmed is selected and displayed on the terminal apparatus 10, for example, a screen is displayed as illustrated in FIG. 10.

Figure 11:
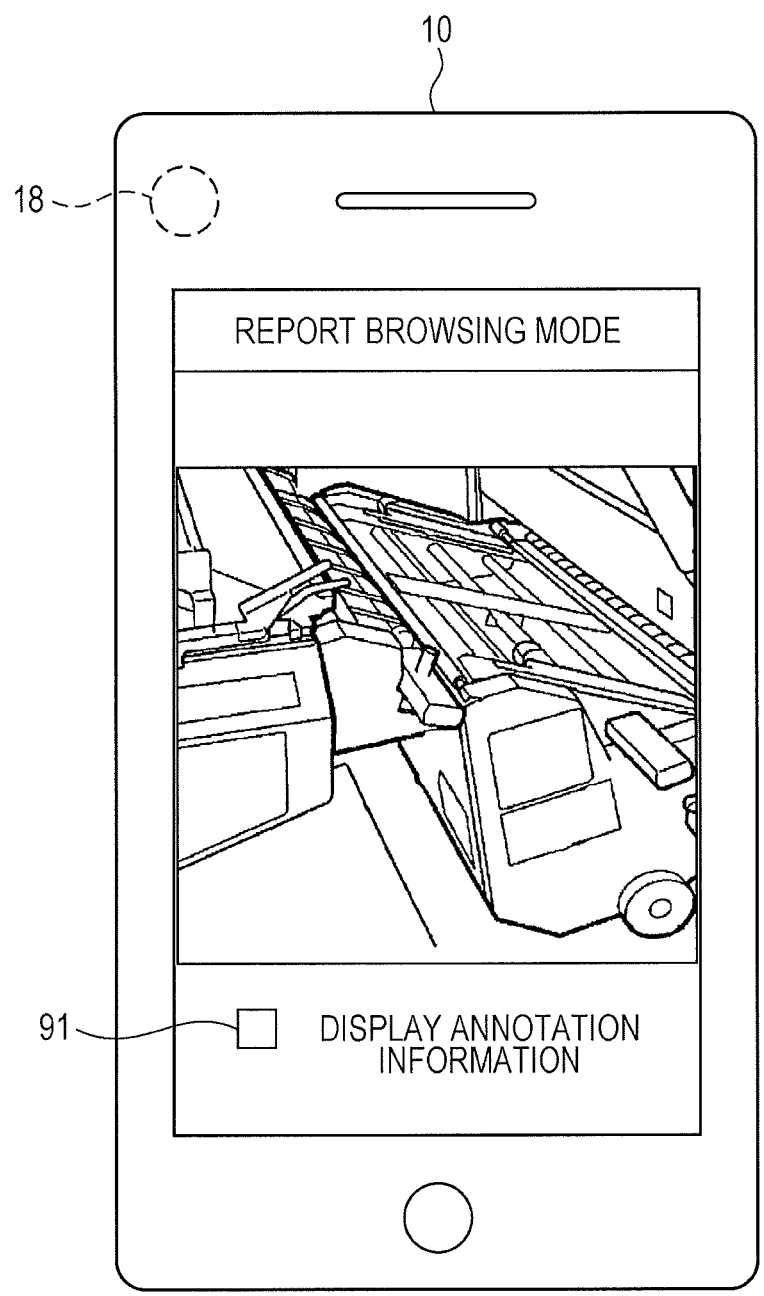
FIG. 11 illustrates a display screen example for a case where an image without annotation information added thereto is displayed on the terminal apparatus in the report browsing mode.
Figure 12:
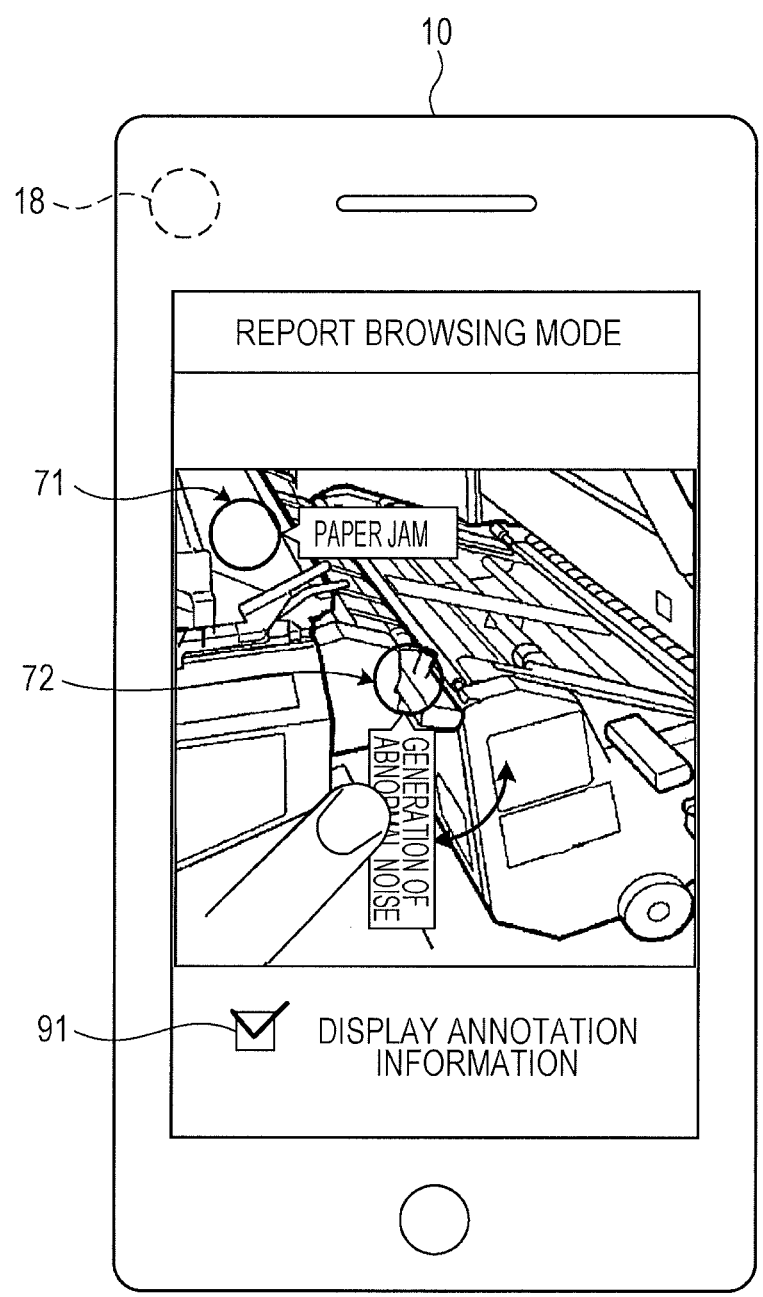
FIG. 12 is a diagram for explaining a state in which a comment field of explanatory information of the annotation information is dragged and rotated in the display screen example illustrated in FIG. 10.

In the display screen example illustrated in FIG. 10, a check box 91 for inputting a selection as to whether or not annotation information is to be added to the image data and displayed, is displayed. When the user touches and selects the check box 91, an image including the annotation information 71 and 72 added thereto is displayed, as illustrated in FIG. 10. When the user touches the check box 91 again to cancel the selection, an image without the annotation information 71 and 72 added thereto is displayed, as illustrated in FIG. 11.

Furthermore, in the image including the annotation information 71 and 72 added thereto as illustrated in FIG. 10, when the user drags the comment field of explanatory information of the annotation information 72, the user is able to move the comment field by rotating around the circumference of the circular-shape display which is the location information.

That is, in the report browsing mode, the display location of the location information 81 is configured to be unmovable.

The state of being unmovable is not necessarily limited to a state in which the location information 81 is completely unmovable. The state of being unmovable includes, for example, a state of performing control for the display location of the location information 81 to temporarily move within a specific range and return to the original location in accordance with the lapse of time.

Therefore, if the user wants to see an image beneath the comment field, the comment field may be dragged and moved to a location where the comment field is out of the way. Also in this case, the display location of the circular-shape display, which is location information, is unchanged and the display location is maintained as it is.

Figure 13:
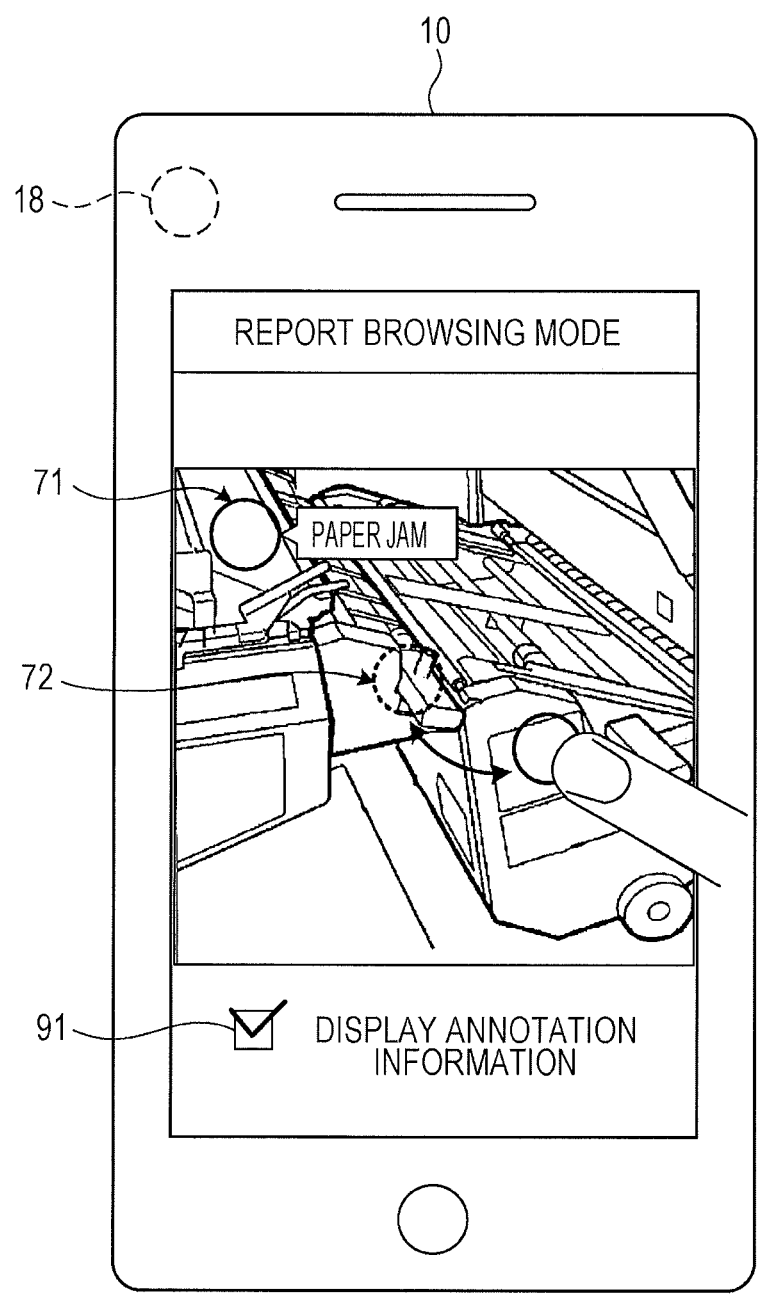
FIG. 13 is a diagram for explaining an operation for temporarily moving the annotation information from an original display location by a drag operation.

Furthermore, as illustrated in FIG. 13, in the browsing mode, control may be performed such that the display location of the circular-shape display is changed based on a drag operation for the circular-shape display on the touch panel, and when the user's finger becomes out of contact with the touch panel and the drag operation for the circular-shape display is finished, the circular-shape display is returned to the original display location and displayed.

If such an operation is possible, the user is able to temporarily move annotation information from the fault occurrence location and confirm the fault occurrence location without the annotation information.

Figure 14:
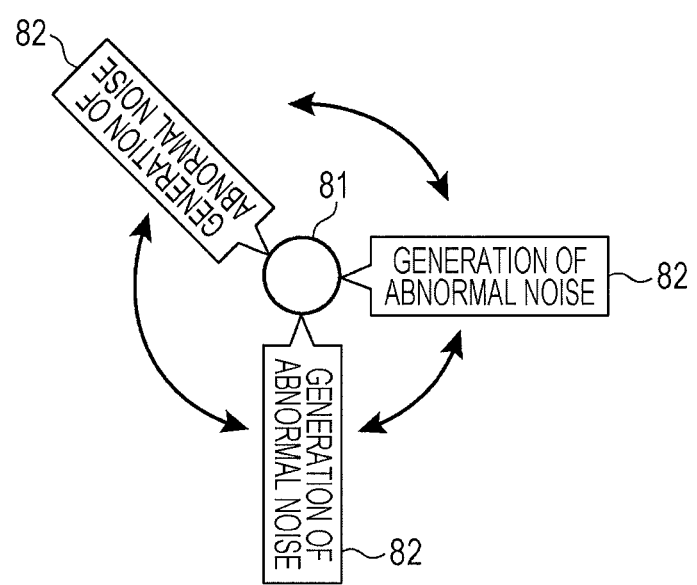
FIG. 14 is a diagram for explaining a state in which, when location information is displayed in a circular shape, the explanatory information is rotatable around the circumference of the location information.

In this exemplary embodiment, as illustrated in FIG. 14, the location information 81 is displayed in a circular shape and the explanatory information 82 is rotatable around the circumference of the circular location information 81. However, the location information 81 may have a shape different from the circular shape.

Figure 15:
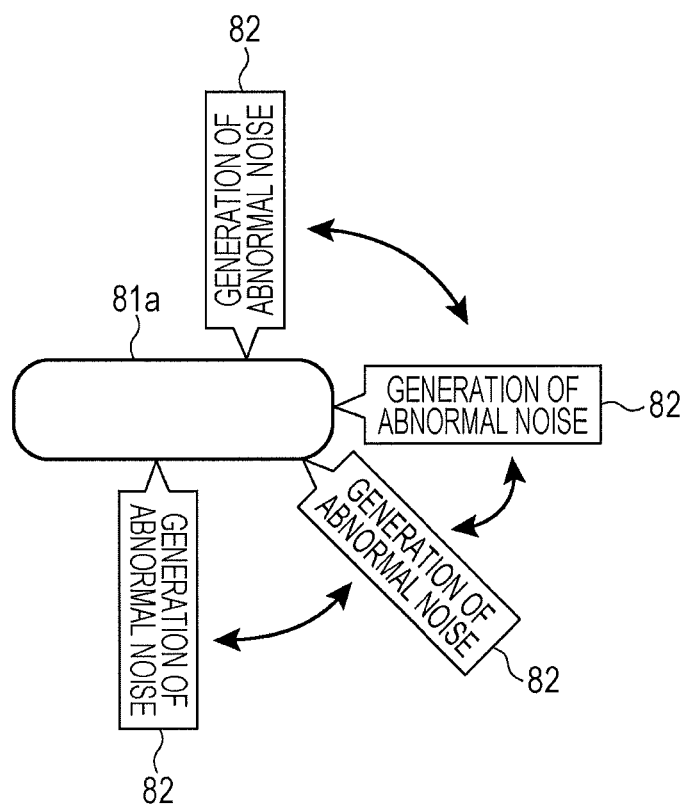
FIG. 15 is a diagram for explaining a state in which, when location information is an oval or rectangular shape, the explanatory information is movable around the circumference of the location information.

For example, when a fault occurrence location is not a single point but has a horizontally long or vertically long shape, the shape of location information 81a may be an oval or rectangular shape, and the explanatory information 82 may be configured to be movable around the circumference of location information 82a, as illustrated in FIG. 15.

[Variations]

In the above exemplary embodiment, a case where the present invention is applied to a fault report system for reporting a fault which has occurred in the image forming apparatus 20 as a target electronic apparatus has been described. However, the present invention is not limited to the above case. The present invention is also applicable to a case where an image of information to be transmitted is attached, information including annotation information added within the image is transmitted or stored, and the image is displayed when the information is browsed. Furthermore, the present invention is also applicable to an information transmission/reception system in which information including an image is simply transmitted and received between terminal apparatuses and the terminal apparatus that receives the information browses the information and displays the image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal apparatus comprising:
an input unit configured to input, a fault which has occurred in a target electronic apparatus, in an input mode; and
a browsing unit configured to allow browsing of the fault input, in a report browsing mode,
wherein the input unit includes an adding unit that adds during the input mode, to an image concerning the fault, commentary information which includes location information indicating a part within the image and explanatory information regarding the part within the image indicated by the location information, and
wherein the browsing unit is configured such that, during the report browsing mode, a display location of the location information, out of the commentary information, is unchangeable by a user from a position set by the input unit during the input mode, and the explanatory information is rotatable around the location information.

2. The terminal apparatus according to claim 1,
wherein when the fault is browsed with the browsing unit, a selection as to whether or not the commentary information is to be added to the image and displayed is input, and
wherein the browsing unit switches, based on the input selection, between browsing in a state in which the commentary information is added to the image and browsing in a state in which the commentary information is not added to the image.

3. The terminal apparatus according to claim 1,
wherein the location information is displayed in a circular shape, and the explanatory information is a text field provided on a circumference of the circular-shape display.

4. The terminal apparatus according to claim 3, wherein at least one of a shape, a size, and a color of the circular-shape display is changed in accordance with content of a fault to report.

5. A fault report system comprising:
a terminal apparatus; and
a parent apparatus,
wherein the terminal apparatus includes
an input unit configured to input a fault which has occurred in a target electronic apparatus, in an input mode, and
a browsing unit configured to allow browsing of the fault input, in a report browsing mode,
wherein the input unit includes an adding unit that adds, during the input mode, to an image concerning the fault, commentary information which includes location information indicating a part within the image and explanatory information regarding the part within the image indicated by the location information, wherein the browsing unit is configured such that, during the report browsing mode, a display location of the location information, out of the commentary information, is unchangeable by a user from a position set by the input unit during the input mode, and the explanatory information is rotatable around the location information, and wherein the parent apparatus includes a communication unit that communicates with the terminal apparatus, and a storage unit that stores transmission information received from the terminal apparatus.

6. A non-transitory computer readable medium storing a program causing a computer to execute a process comprising:

inputting a fault which has occurred in a target electronic apparatus, in an input mode; and allowing browsing of the input fault, in a report browsing mode, wherein the inputting includes adding, during the input mode, to an image concerning the fault, commentary information which includes location information indicating a part within the image and explanatory information regarding the part within the image indicated by the location information, and wherein the browsing is configured such that, during the report browsing mode, a display location of the location information, out of the commentary information, is unchangeable by a user from a position set during the input mode, and the explanatory information is rotatable around the location information.

7. A terminal apparatus comprising:

an input unit configured to input a fault which has occurred in a target electronic apparatus, in an input mode; and a browsing unit configured to allow browsing of the fault input, in a report browsing mode, wherein the input unit includes an adding unit that adds, during the input mode, to an image concerning the fault, commentary information which includes location information indicating a part within the image and explanatory information regarding the part within the image indicated by the location information, and wherein the browsing unit is configured such that, during the report browsing mode, a display location of the location information, out of the commentary information, is unchangeable except for a state of performing control for the display location of the location information to temporarily move within a specific range, and the explanatory information is rotatable around the location information, wherein at a time of browsing the fault, the browsing unit temporarily changes the display location of the location information during an operation on the location information starting the state of performing control for the display location of the location information, and when the operation on the location information is finished, the browsing unit returns the location information to the display location.

8. The terminal apparatus according to claim 7, wherein at least one of a shape, a size, and a color of the circular-shape display is changed in accordance with content of a fault to report.

* * * * *